United States Patent
Kim et al.

(10) Patent No.: US 10,826,087 B2
(45) Date of Patent: Nov. 3, 2020

(54) HYDROGEN PURGING DEVICE AND METHOD FOR FUEL CELL SYSTEM

(71) Applicant: HYUNDAI MOTOR COMPANY, Seoul (KR)

(72) Inventors: Young Min Kim, Gangneung-si (KR); Jong Hyun Lee, Yongin-si (KR); Dong Jo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 389 days.

(21) Appl. No.: 15/457,348

(22) Filed: Mar. 13, 2017

(65) Prior Publication Data

US 2017/0187052 A1   Jun. 29, 2017

Related U.S. Application Data

(62) Division of application No. 14/102,296, filed on Dec. 10, 2013, now abandoned.

(30) Foreign Application Priority Data

Aug. 21, 2013 (KR) .......................... 10-2013-0098832

(51) Int. Cl.

| | |
|---|---|
| *H01M 8/04223* | (2016.01) |
| *H01M 8/043* | (2016.01) |
| *H01M 8/04858* | (2016.01) |
| *H01M 8/04537* | (2016.01) |

(Continued)

(52) U.S. Cl.

CPC ....... *H01M 8/04231* (2013.01); *H01M 8/043* (2016.02); *H01M 8/04141* (2013.01); *H01M 8/04179* (2013.01); *H01M 8/04641* (2013.01); *H01M 8/04873* (2013.01); *H01M 2008/1095* (2013.01); *H01M 2250/20* (2013.01); *Y02T 90/32* (2013.01)

(58) Field of Classification Search

CPC ......... H01M 8/04231; H01M 8/04641; H01M 8/04873; H01M 8/043; H01M 8/04179; H01M 8/04141; H01M 2008/1095; H01M 2250/20; Y02T 90/32

See application file for complete search history.

(56) References Cited

U.S. PATENT DOCUMENTS

| | | | |
|---|---|---|---|
| 2006/0194087 A1* | 8/2006 | Park ................. | H01M 8/04007 429/435 |
| 2011/0048837 A1 | 3/2011 | Kwon et al. | |
| 2011/0217608 A1 | 9/2011 | Matsumoto et al. | |

FOREIGN PATENT DOCUMENTS

| | | |
|---|---|---|
| JP | 2003-168467 A | 6/2003 |
| JP | 2004-071307 A | 3/2004 |
| JP | 2006-244926 A | 9/2006 |

(Continued)

*Primary Examiner* — Eugenia Wang

(74) *Attorney, Agent, or Firm* — Morgan, Lewis & Bockius LLP

(57) ABSTRACT

A hydrogen purging device for a fuel cell system includes a humidifier that humidifies dry air supplied from an air blower, using moist air discharged from a cathode of a stack and supplies the humidified air to the cathode. A water trap and a hydrogen recirculation blower are sequentially connected to an outlet of an anode, wherein a hydrogen outlet of the water trap and an inlet of the humidifier are connected by a cathode-hydrogen purging line for purging hydrogen to the cathode so that the hydrogen discharged from the anode of the fuel stack is purged to the cathode during idling or during normal driving.

2 Claims, 4 Drawing Sheets

(51) Int. Cl.
 *H01M 8/04119* (2016.01)
 *H01M 8/1018* (2016.01)

(56) References Cited

FOREIGN PATENT DOCUMENTS

| | | |
|---|---|---|
| JP | 2007-299737 A | 11/2007 |
| KR | 10-0464051 B1 | 1/2005 |
| KR | 10-2008-0098531 A | 11/2008 |
| KR | 10-2010-0005768 A | 1/2010 |
| KR | 10-1113651 B1 | 2/2012 |
| KR | 10-1339240 B1 | 12/2013 |

* cited by examiner

HYDROGEN PURGING DEVICE AND METHOD FOR FUEL CELL SYSTEM

CROSS-REFERENCE TO RELATED APPLICATION

This application is a divisional patent application of U.S. patent application Ser. No. 14/102,296, filed on Dec. 10, 2013, now abandoned, which in turn claims under 35 U.S.C. § 119(a) the benefit of priority to Korean Patent Application No. 10-2013-098832, filed on Aug. 21, 2013, the entire contents of which are incorporated herein by reference.

TECHNICAL FIELD

The present disclosure relates to a hydrogen purging device and method for a fuel cell system. More particularly, the present disclosure relates to a hydrogen purging device and method for a fuel cell system which improve durability of a fuel cell by purging hydrogen, which is discharged from an anode, to a cathode through an inlet of a humidifier.

BACKGROUND

Fuel cell systems mounted on fuel cell vehicles, as shown in FIG. 1, include a fuel cell stack 10 generating electrical energy, a fuel supply system 20 supplying fuel (hydrogen) to the fuel cell stack 10, an air supply system 30 supplying oxygen in the air for an electrochemical reaction to the fuel cell stack 10, and a heat and water management system controlling an operation temperature of the fuel cell stack 10.

The air supply system 30 includes an air blower 31 supplying external air to a humidifier 32, and the humidifier 32 humidifying dry air supplied from the air blower 31 with moist air discharged from a cathode of the stack 10 and supplying the humidified air to the cathode.

The fuel supply system 20 includes a water trap 21 and a hydrogen recirculation blower 22 sequentially connected to an outlet of an anode, in order to recirculate non-reacted hydrogen purged at the anode back to the anode, in addition to supplying new hydrogen fuel to the anode.

Since nitrogen or water accumulated at the anode in the fuel cell stack operation deteriorates the stack performance, the nitrogen or the water is discharged with a periodic hydrogen purging from the anode.

In the hydrogen purging from the anode, some of the hydrogen discharged with the water is recirculated and supplied to the anode by operating the hydrogen recirculation blower 22 after passing through the water trap 21 for reuse, and the rest is discharged to the outside through a shell side of the humidifier 32 in the air supply system 30 along a hydrogen purging line 23.

For reference, the humidifier 32 has dry air flow spaces for the dry air supplied from the air blower 31 and a moist air flow space for the moist air discharged from the cathode, which are separated by hollow fiber membranes in which the hydrogen purging line 23 passes the shell side of the humidifier 32.

The hydrogen purging on the anode described above is for securing durability of cells by removing nitrogen and water because nitrogen and water vapor accumulate at the anode in the fuel cell system operation and decrease a concentration of newly supplied hydrogen.

However, since the hydrogen purged with the water from the anode is discharged to the outside (atmosphere) through the shell side of the humidifier along the hydrogen purging line, safety rules for the hydrogen exhaust concentration may not be satisfied in some cases.

It has been known that when the cell voltage is temporarily decreased in an idling section of a fuel cell vehicle, internal components of the fuel cell need to be minimally exposed to high potential to improve the durability of cells.

There is a method in the related art which freely decreases the cell voltage in an idling section of a fuel cell vehicle by connecting a separate resistor to the anode and the cathode of a fuel cell, as shown in FIG. 2, but in this case, additional hydrogen fuel is consumed to apply voltage across the resistor.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure provides a hydrogen purging device and method for a fuel cell system which can improve durability of a fuel cell while preventing an exposure of cells to high potential by purging hydrogen, which is discharged from an anode during idling or normal driving of a fuel cell vehicle, into a cathode through an inlet of a humidifier, such that the hydrogen purged to the cathode causes a drop in voltage potential of cells while producing water by reacting with air.

According to an exemplary embodiment of the present disclosure, a hydrogen purging device for a fuel cell system includes a humidifier that humidifies dry air supplied from an air blower, using moist air discharged from a cathode of a stack and supplies the humidified air to the cathode. A water trap and a hydrogen recirculation blower are sequentially connected to an outlet of an anode. A hydrogen outlet of the water trap and an inlet of the humidifier are connected by a cathode-hydrogen purging line for purging hydrogen to the cathode so that hydrogen discharged from the anode of the fuel stack is purged to the cathode during idling or normal driving.

A valve that allows or stops hydrogen purging to the cathode may be disposed in the cathode-hydrogen purging line.

According to another exemplary embodiment of the present disclosure, a hydrogen purging method includes a first step of purging hydrogen from an anode of a fuel cell stack, a second step of supplying the purged hydrogen to an inlet of a humidifier, and a third step of passing the hydrogen supplied to the inlet of the humidifier through the humidifier with air and dispersing the hydrogen to the anode of the fuel cell stack.

The first to third steps may be periodically performed during idling or normal driving of a fuel cell vehicle.

Hydrogen may be purged to the cathode in accordance with the first to third steps when beginning idling the idling section, and the hydrogen purging to the cathode may be stopped in accordance with the first to third steps when a cell voltage drops to or below a reference voltage.

Hydrogen may be purged to the cathode in accordance with the first to third steps when the amount of charge of the cells is a predetermined level or more during normal driving, and the hydrogen purging to the cathode may be stopped in accordance with the first to third steps when the voltage differences of the cells are at or above a predetermined level.

The embodiments of the present disclosure provide the following effects as set forth herein.

According to the present disclosure, hydrogen discharged from an anode is purged into a cathode through an inlet of a humidifier without being discharged to the outside, and the hydrogen purged to the cathode causes the voltage potential of cells to drop while producing water by reacting with air, thus preventing cells from being exposed to high potential and improving durability of a fuel cell.

In particular, as the hydrogen discharged from the anode is purged to the cathode during idling of a fuel cell vehicle, it is possible to temporarily drop the cell voltage and improve the durability of the fuel cell by preventing an exposure of internal components, such as, an electrolyte membrane, a catalyst layer, etc., of the fuel cell to a high potential because of the drop in cell voltage.

Although the higher the operation cycle of the fuel cell, the more the durability of the fuel cell decreases, and the voltage of the entire fuel cells drops, the present disclosure can reduce a deterioration ratio of the cell voltage of the fuel cell by about three times, thereby improving the durability of the fuel cell and increasing an operation cycle.

As the hydrogen discharged from the anode is discharged to the atmosphere, safety rules for hydrogen exhaust concentration may not be satisfied in some cases. However, the present disclosure discharges hydrogen to the cathode, thereby satisfying the safety rules for hydrogen exhaust concentration.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

Figure 1:
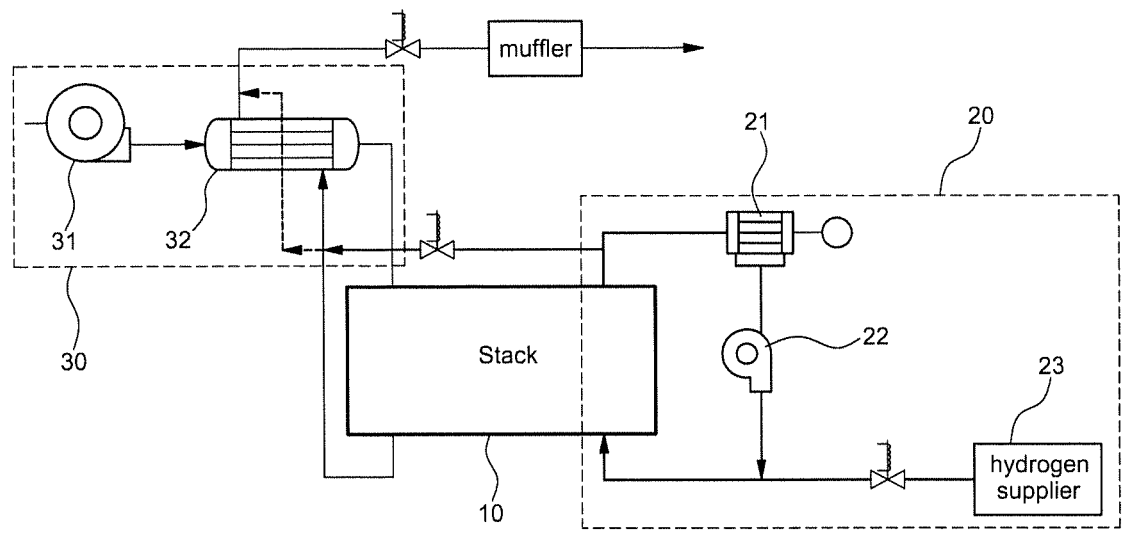
FIG. 1 is a diagram illustrating a configuration of a hydrogen purging device for a fuel cell system of the related art.
Figure 2:
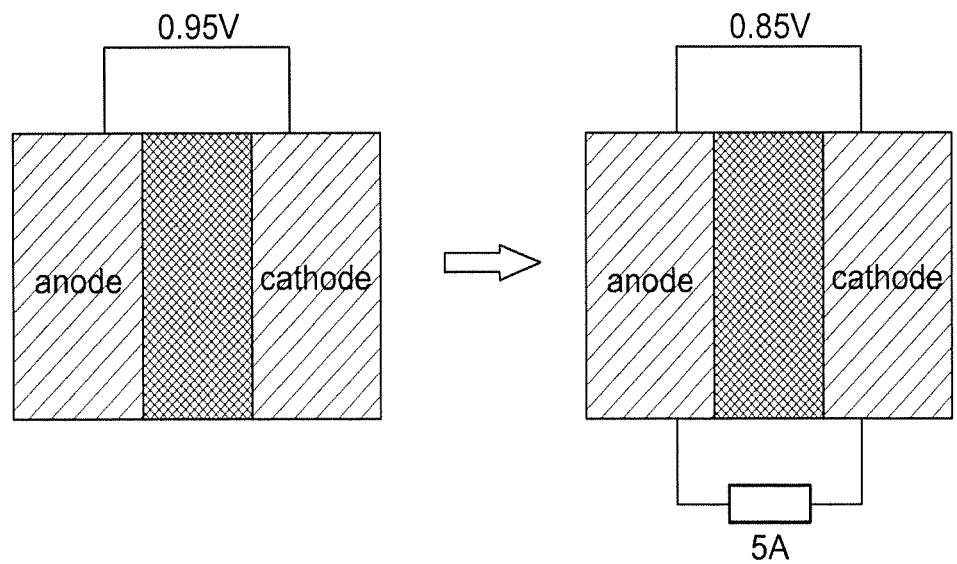
FIG. 2 is a diagram schematically illustrating a method of dropping cell voltage during idling in the related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, exemplary embodiments of the present disclosure will be described more fully with reference to the accompanying drawings for those skilled in the art to implement the present disclosure.

Figure 3:
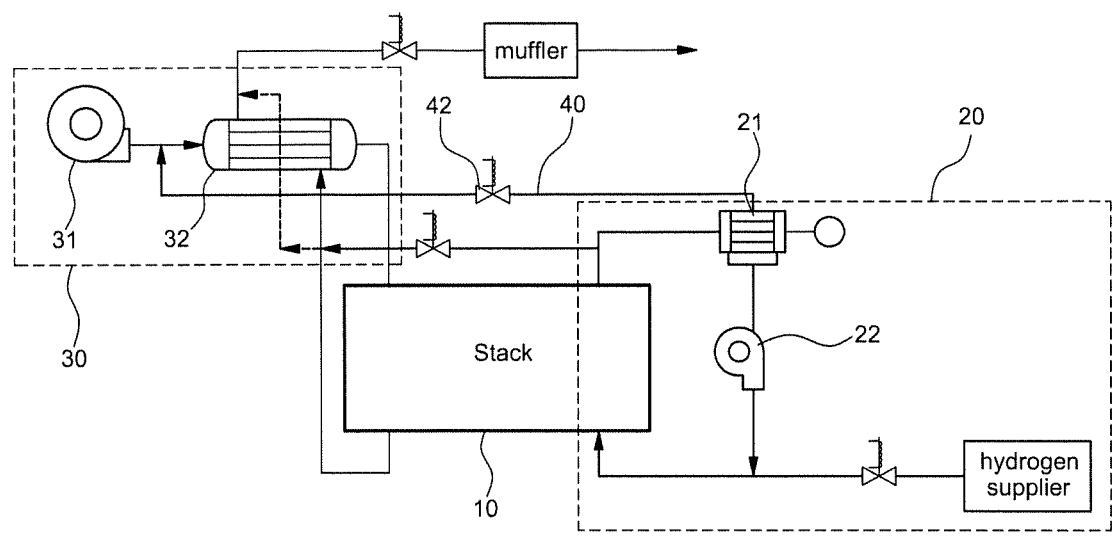
FIG. 3 is a diagram illustrating a configuration of a hydrogen purging device for a fuel cell system according to the present disclosure.

Referring to FIG. 3, an air supply system 30 for supplying air to a fuel cell stack 10 includes an air blower 31 supplying external air to a humidifier 32, and a humidifier 32 humidifying dry air supplied from the air blower 31 with moist air discharged from a cathode of the stack 10 and supplying the humidified air to the cathode.

A fuel supply system 20 supplying hydrogen to the fuel cell stack 10 includes a water trap 21 and a hydrogen recirculation blower 22 sequentially connected to the outlet of an anode in order to recirculate non-reacted hydrogen purged at the anode back to the anode, in addition to supplying new hydrogen fuel to the anode.

According to the present disclosure, a hydrogen outlet of the water trap 21 and an inlet (an inlet through which air flows into the humidifier 32 from the air blower 31) of the humidifier 32 are connected by a cathode-side hydrogen purging line 40 for purging hydrogen to the cathode so that hydrogen discharged from the anode of the fuel cell stack can be purged to the cathode during idling or normal driving. Idling refers to when the vehicle is on but stationary, and normal driving refers to a vehicle moving without stopping.

A solenoid type valve 42 is disposed in the cathode-side hydrogen purging line 40 to purge the hydrogen to the cathode or to stop the hydrogen from being purged to the cathode when the cell voltage drops to or below a reference voltage.

Figure 4:
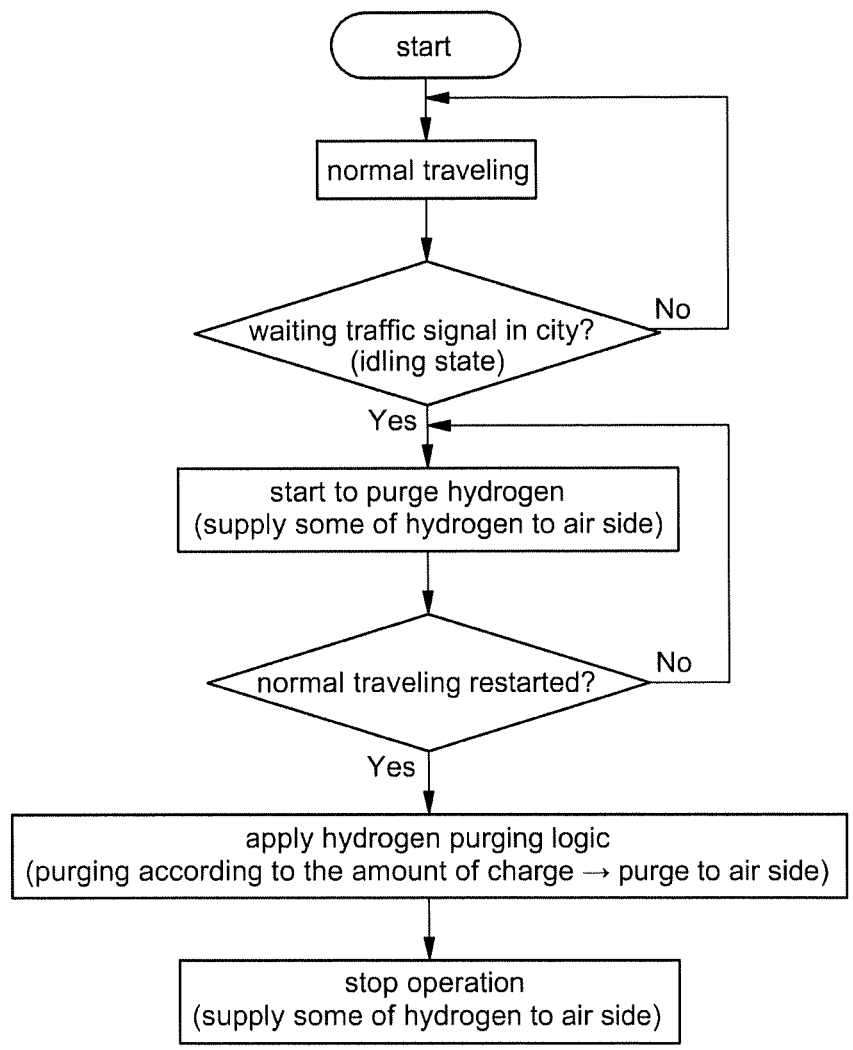
FIG. 4 is a flowchart illustrating a hydrogen purging method for a fuel cell system according to the present disclosure.

A hydrogen purging method of the present disclosure based on a configuration is described hereafter with reference to FIGS. 3 and 4.

When a fuel cell vehicle equipped with a fuel cell system idles, such as while stopped, for example, waiting at a traffic signal in a city while driving normally, the hydrogen purging method of the present disclosure is performed.

The hydrogen purging method of the present disclosure includes a first step of purging hydrogen from an anode of a fuel cell stack, a second step of supplying the purged hydrogen to an inlet of a humidifier, and a third step of passing the supplied hydrogen to the inlet of the humidifier through the humidifier with air and dispersing the hydrogen to an anode of the fuel cell stack.

In the first step, as the hydrogen is purged from the anode, the hydrogen is discharged with water, in which the water is held in an internal space of the water trap 21 and the hydrogen passes through the internal space of the water trap 21.

In the second step, the purged hydrogen passing through the water trap 21 is supplied to the inlet of the humidifier 32 along the cathode-side hydrogen purging line 40, and the valve 42 in the hydrogen purging line 40 is opened to allow the hydrogen purge.

In the third step, the hydrogen supplied to the inlet of the humidifier 32, that is, the inlet into which dry air flows from the air blower 31, passes through the humidifier 32 with the water from the air blower 31, and is purged to the cathode of the fuel cell stack 10.

The hydrogen purged to the cathode of the fuel cell stack during idling causes the voltage potential of the cells of the fuel cell stack to drop while producing water by reacting with air at the cathode.

That is, the hydrogen purged to the cathode produces water by reacting with some of the air supplied to the cathode to generate electricity in the fuel cell stack, thus as the amount of air decreases, the voltage potential of the cells may temporarily drop.

Figure 5:
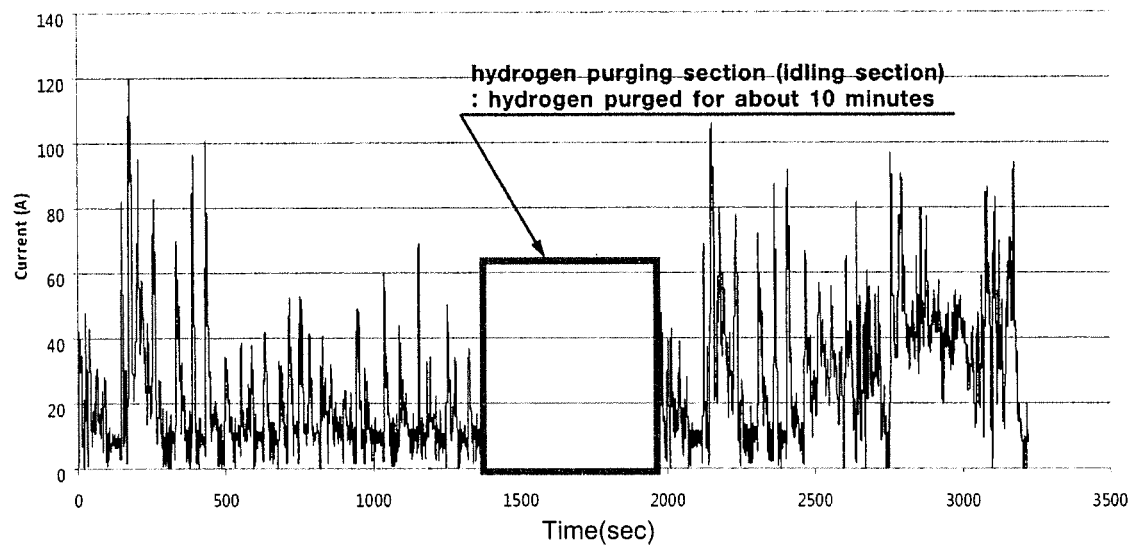
FIG. 5 is a diagram schematically illustrating idling where hydrogen purging for a fuel cell system according to the present disclosure is performed.
Figure 6:
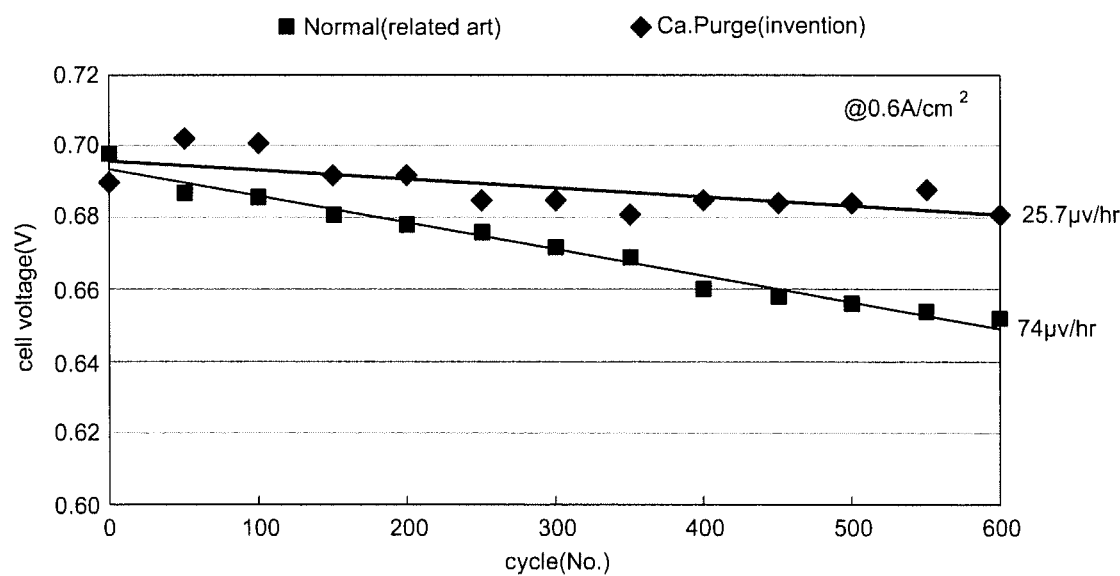
FIG. 6 is a graph comparing cell voltage drop ratios according to operation cycles which are measured in an operation that uses a hydrogen purging method for a fuel cell system according to the present disclosure and during ordinary operation.

Referring to FIG. 5, as a test example of the present disclosure, a test that operates a fuel cell system including a fuel cell stack, such as a cell proton exchange membrane fuel cell (PEMFC) stack, in an actual driving mode was conducted for a total operation time of 600 cycles (1 cycle: 1 hr) while purging hydrogen to a cathode for about 10 minutes during idling.

The test results show that cell voltage drops from 0.945 V to 0.821 V during idling while the hydrogen is purged to the cathode.

Therefore, it is possible to reduce a corrosion due to exposure of internal components, such as, an electrolyte membrane, a catalyst layer, etc., of the fuel cell to high potential because of the voltage drop of the cells during idling, thus improving durability of the fuel cell.

As described above, since the hydrogen purged at the anode is purged to the cathode to drop the voltage without being discharged to the outside, the exposure of the internal components, such as, the electrolyte membrane, the catalyst layer, etc., to high voltage potential is prevented due to the voltage drop of the fuel cell. Therefore, it is possible to improve the durability of the fuel cell, and thereby, satisfy the safety rules for hydrogen exhaust concentration since the hydrogen is purged to the cathode.

Further, since the cell voltage is reduced by the hydrogen purging to the cathode in accordance with the first to third steps, and the operation state of the fuel cell may become abnormal when the cell voltage drops to or below a reference voltage, purging the hydrogen to the cathode is stopped when the voltage of the fuel cell is reduced to or below the reference voltage. The valve 42 in the cathode-hydrogen purging line 40 is controlled to close and stop hydrogen from being purged to the cathode.

The hydrogen purging method of the present disclosure is also used at a certain amount of charge of the fuel cells in restarting of normal driving after a period of idling, in addition to during idling.

That is, the hydrogen purging method according to the first to third steps is performed even when the amount of charge of the cells is at or above a predetermined amount while driving normally, thus minimizing the exposure of the internal components of a fuel cell to high cell potential and stopping hydrogen purged to a cathode when the voltage differences of cells are at or above a predetermined level.

As another test example of the present disclosure, a test of durability of a fuel cell by the hydrogen purging method of the present disclosure was conducted as follows, as compared with the related art.

Subject of test: 20 cell proton exchange membrane fuel cell (PEMFC) stack

Test equipment: Small breadboard

For reference, when a fuel cell system is installed in a laboratory, it is called a breadboard.

Operating conditions:

Operation temperature: 58° C.

Air fuel stoichiometric ratio: 2.2

Air humidification type: Membrane humidifier

Hydrogen supply system operation type: Hydrogen recirculation

Cumulative operation time: 600 cycles (1 cycle=1 hr)

Hydrogen was discharged as an ordinary operation, to a cathode without purging it on the basis of the operating conditions. A fuel cell system was operated while purging the hydrogen to a cathode in accordance with the hydrogen purging method of the present disclosure, and then a deterioration ratio of cells and a cell voltage drop ratio were measured.

As a result of measuring, the deterioration ratio (@0.6 A/cm$^2$) was 2.99% in purging of hydrogen to the cathode and 6.59% in the ordinary operation, and the cell voltage drop ratio (@0.6 A/cm$^2$) was −25.7 μV/hr in purging of hydrogen to a cathode and 74 μV/hr in the ordinary operation. Therefore, it is possible to reduce the cell voltage drop ratio about three times for the same operation cycle.

It has been known that the higher the operation cycle of a fuel cell, the greater the decrease in durability of the fuel cell, and the voltage of the entire cell stack drops. However, according to the present disclosure, it is possible to reduce the voltage drop ratio of the cell about three times in the same cycle operation, as compared with the ordinary operation of the related art, therefore it is possible to increase the durability of a fuel cell in the operation cycle of a fuel cell.

Although embodiments of the present disclosure were described in detail above, the scope of the present disclosure is not limited thereto, and various changes and modifications from the spirit of the present disclosure defined in the following claims by those skilled in the art are also included in the scope of the present disclosure.

The disclosure has been described in detail with reference to the exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A hydrogen purging method comprising:
a first step of purging hydrogen from an anode of a fuel cell stack;
a second step of supplying the purged hydrogen to an inlet of a humidifier; and
a third step of passing the purged hydrogen supplied to the inlet of the humidifier through the humidifier with air and dispersing the purged hydrogen to a cathode of the fuel cell stack,
wherein the purged hydrogen passes through a cathode-side hydrogen purging line, connected between a hydrogen outlet of a water trap and the inlet of the humidifier, to the cathode of the fuel cell stack in accordance with the first to third steps when an idling begins, and hydrogen purging to the cathode is stopped in accordance with the first to third steps when a cell voltage drops to or below a reference voltage, wherein the hydrogen purging to the cathode according to the first to third steps is performed when an amount of charge of cells of the fuel cell stack is at or above a predetermined amount during a normal driving of a fuel cell vehicle so as to prevent an exposure of internal components of the fuel cell stack to a predetermined high cell potential, and wherein the hydrogen purging to the cathode is stopped when voltage differences of the cells are at or above a predetermined level.

2. The method of claim 1, wherein the first to third steps are periodically performed during the idling or during the normal driving of the fuel cell vehicle.

\* \* \* \* \*